United States Patent

[11] 3,582,537

[72] Inventor Aime J. Perreault
 South Burlington, Vt.
[21] Appl. No. 880,012
[22] Filed Nov. 26, 1969
[45] Patented June 1, 1971
[73] Assignee Haveg Industries, Inc.
 Wilmington, Del.

[54] WOVEN CABLE WITH BONDED WOVEN LATTICE STRUCTURE
 12 Claims, 4 Drawing Figs.
[52] U.S. Cl. .................................................. 174/117,
 29/592, 139/425, 156/148
[51] Int. Cl. .................................................. H01b 7/08
[50] Field of Search .......................................... 174/117,
 117.2; 338/208; 29/592; 156/148; 139/425

[56] References Cited
UNITED STATES PATENTS
3,378,629  4/1968  Rask ............................ 174/117(.2)

Primary Examiner—E. A. Goldberg
Attorney—Sheldon F. Raizes

ABSTRACT: A woven ribbon cable wherein a woven lattice structure holds a plurality of conductor wires in a given spaced parallel relationship and has its warp and weft members bonded to each other at the intersections thereof, whereby the lattice structure can be pushed back from one end of the cable as a unitary structure without unraveling or fraying during insulation stripping of the cable for termination or any of the wires of the cable can be removed from the cable without disturbing the lattice structure.

PATENTED JUN 1 1971   3,582,537

INVENTOR
AIME J. PERREAULT

BY Sheldon F. Raizes
ATTORNEY

WOVEN CABLE WITH BONDED WOVEN LATTICE STRUCTURE

The woven ribbon cables that are commonly found on the market comprise a plurality of parallel extending insulated electrical wires which are interwoven with yarn that traverse the warp and weft directions and serve to hold the wires together in fixed parallel relationship forming a multiconductor cable. An example of a woven cable is shown by U.S. Pat. No. 3,197,555.

A disadvantage of the commercial woven cables is the yarn unravels easily at the termination end of the cable resulting in the wires becoming loosely spaced at the end. Also, if one of the wires of the cable is removed, the woven lattice structure loosens and the cable integrity is lost.

An object of this invention is to provide a woven cable with a unitary lattice structure whereby any wire in the cable may be removed without destroying the integrity of the cable and the insulation on the wires may be stripped for termination without incurring unraveling of the yarn and loosening of the cable.

The invention may be more readily understood by referring to the drawings wherein.

Figure 1:
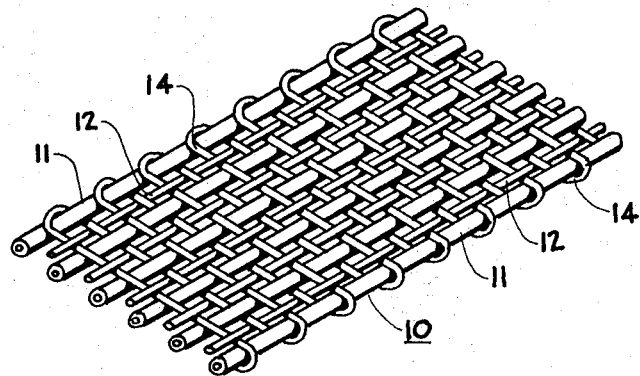
FIG. 1 is a view of a woven cable.

Referring to FIG. 1, there is shown a woven cable 10 comprising a plurality of insulated wires 11 and a woven lattice structure comprising a plurality of multifilament yarns 12 extending in a warp direction and a multifilament yarn 14 woven back and forth in the weft direction. The yarns 12 and 14 are interwoven with each other and the yarn 14 is also interwoven with the wires 11 whereby the wires 11 are held closely together in parallel relationship to form a cable. The weaving pattern of the lattice structure is not important and can vary in accordance with necessary requirements. Interweaving of the wires and yarn can be carried out on any well-known loom, a Jacquard loom being preferred.

FIG. 1 illustrates a woven cable in the form commonly found on the market. The following example illustrates one embodiment of this invention for improving the cable of FIG. 1.

EXAMPLE 1

Figure 2:
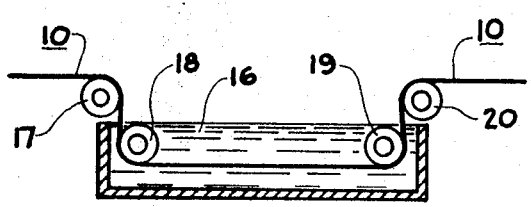
FIG. 2 is a view of a woven cable in a lattice structure bonding process.

The cable 10 of FIG. 1 had 35 conductors 11 each insulated with sintered polytetrafluoroethylene (referred to hereinafter as TFE). The yarn 12, 14 was 60 denier nylon polyamide. Each yarn 12, 14 was made of a plurality of filaments twisted together. The spacing of the yarns in the warp and weft directions was 3/32 inch. Referring to FIG. 2, the cable 10 was placed in an aqueous formic acid bath 16 which acts as a solvent on the nylon yarn. The strength of the acid was adjusted according to the desired bond. The bath was 1-foot long, 4-inches wide and 4-inches deep and the formic acid was at room temperature. The cable 10 was passed over a roller 17, under a pair of longitudinally spaced stainless steel rollers 18, 19 which are provided to keep the cable submerged in the formic acid bath and out of the bath and over a roller 20. The cable 10 was passed through the bath at the rate of 6 feet per minute resulting in a dwell time of approximately 10 seconds and the cable was then quenched in water for neutralizing and passed into a hot air oven to dry as well as remove slight traces of residual acid.

Figure 3:
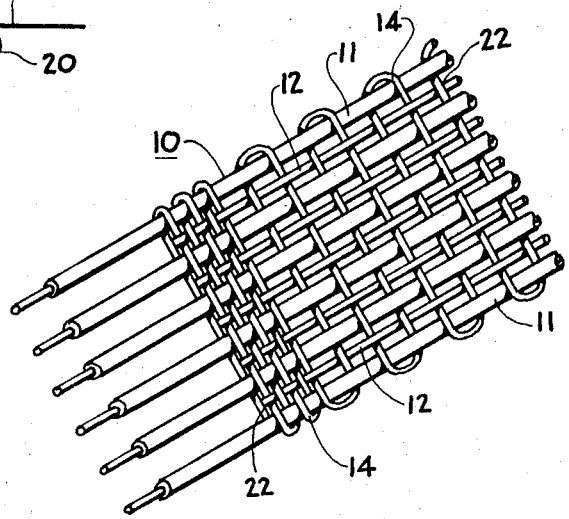
FIG. 3 is a view of the woven cable after the curing process and shown in condition for insulation stripping for termination.
Figure 4:
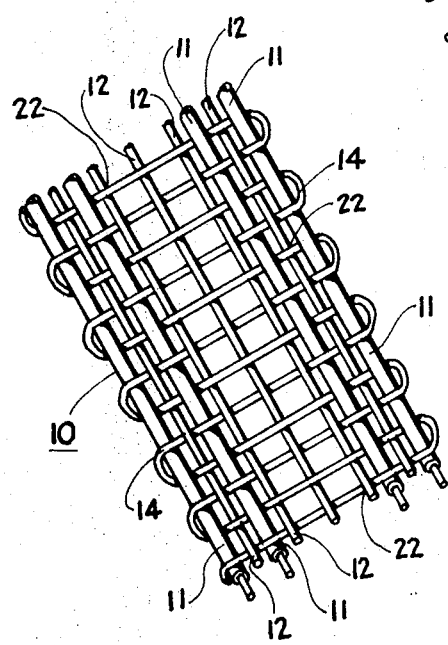
FIG. 4 is a view of the woven cable after the bonding process and shown with several wires withdrawn from the cable.

The resulting cable showed that the individual filaments making up each yarn 12 and 14 were bonded together and the warp and weft yarns were bonded to each other at each intersection 22 thereof. The bond was sufficient to provide a unitary lattice structure under normal use although it could be broken by hand. The yarn did not stick to the insulation and the insulation was not attacked by the acid. The lattice structure, as a unit, could be pushed back from one end of the cable (FIG. 3) to expose the ends of each wire for insulation stripping for termination and then the lattice structure could be returned to cover the end of the cable to hold the ends of the wire in closely parallel relationship. Also, any number of wires could be withdrawn from the lattice structure without disturbing the lattice structure or the spaced relationship between the remaining wires as shown in FIG. 4.

EXAMPLE 2

The procedure of Example 1 was repeated only sintered perfluoroethylene-propylene copolymer (hereinafter referred to as FEP) was used as the insulation. The results were the same as in Example 1.

EXAMPLE 3

The procedure of Example 1 was repeated only polyvinyl chloride (hereinafter referred to as PVC) was used as the insulation. The results were the same as in Example 1.

It is obvious that various yarns and corresponding solvents which do not attack the insulation on the wires can be utilized to obtain the unitary lattice structure. For instance:

a. A polyester yarn and aqueous dimethyl acetamide and/or aqueous dimethyl formamide solvent can be used with polyvinyl chloride or sintered TFE or FEP coated wires; and b. A cellulosic yarn and cupra ammonium sulfate solution as a solvent can be utilized with polyvinyl chloride or sintered TFE or FEP coated wires.

When a solvent bath is used, the dwell time of the cable in the solvent will depend upon the denier of the yarn and should be sufficient to effect softening and bonding of the yarn.

EXAMPLE 4

A fiberglass yarn coated with an unsintered FEP was utilized as a lattice structure over sintered TFE coated wires. The woven cable is then placed in an oven to sinter the FEP effecting a heat seal bond at the points of intersection of the warp and weft yarns.

The resulting cable showed that the warp and weft yarns were bonded to each other at each intersection thereof. The yarn did not stick to the insulation and the lattice structure, as a unit, could be pushed back from one end of the cable (FIG. 3) to expose the ends of each wire for insulation stripping for termination and then the lattice structure could be returned to cover the end of the cable to hold the ends of the wire in closely parallel relationship. Also, any number of wires could be withdrawn from the lattice structure without disturbing the lattice structure or the spaced relationship between the remaining wires as shown in FIG. 4.

The type of yarn and the insulation of the wires may be of any material and are dependent upon the characteristics required of the cable. The yarn should be such that the lattice structure remains unitary and does not stick to the wire insulation yarn upon withdrawing a wire from the lattice structure or upon pushing back the lattice structure from a cable end for insulation stripping for termination at the cable.

The main consideration for bonding the members of the lattice structure to each other is to make sure that if using a solvent, the solvent utilized will not attack the insulation on the wire. If heating or sintering of the yarn is required to effect bonding or fusion thereof, then the insulation on the wires must be of such material that the necessary heating or sintering temperature will not affect fusion or bonding of the insulation to the yarn.

From the above, it can be seen that applicants have provided an improved woven cable that provides a unitary lattice structure for holding the wires in a given spaced parallel relationship when one or more wires are withdrawn therefrom and remains unchanged during stripping for termination.

I Claim:

1. A woven ribbon cable comprising: A plurality of insulated wires extending in a warp direction in generally parallel relationship, said wires being held in parallel relationship by a lattice structure comprising members extending in the warp direction and located between said wires and members extending in a weft direction across the wires and interwoven with said wires and said warp members, said warp members and said weft members being bonded to each other at their points of intersection to provide a unitary lattice structure, the insulation of said wires and said lattice structure being free of bonding therebetween whereby the lattice structure is capable of moving as a unit relative to the insulated wires.

2. A cable as recited in claim 1, wherein said lattice structure members are of a material selected from the group of polyamides, polyesters, or cellulosic yarns.

3. A cable as recited in claim 1, wherein said lattice structure members are fiberglass coated with a perfluorocarbon polymer.

4. A cable as recited in claim 1 wherein the wires are insulated with a perfluorocarbon polymer.

5. A cable as recited in claim 1 wherein the wires are insulated with polyvinyl chloride.

6. A cable as recited in claim 4, wherein said lattice structure members are of a material selected from the group of polyamides, polyesters, or cellulosic yarns.

7. A cable as recited in claim 1, wherein the lattice structure members are fiberglass coated with a plastic material, said plastic material being characterized by the temperature required for effecting bonding of said plastic material to itself being below the temperature required for bonding the insulation to said plastic material.

8. A cable as recited in claim 4 wherein said lattice structure members are fiberglass coated with a perfluorocarbon polymer, the sintering temperature required for said last-named perfluorocarbon polymer being less than the temperature required for bonding said perfluorocarbon insulation to said lattice structure.

9. A cable as recited in claim 8 wherein the fiberglass is coated with perfluoroethylene-propylene copolymer and said insulation is polytetrafluoroethylene.

10. A method for making woven cable comprising: Providing a woven cable having an interwoven lattice structure holding a plurality of wires in spaced parallel relationship, said lattice structure being of a material selected from a group of polyamides, polyesters, or cellulosic yarns, the yarns extending in warp and weft directions, placing said cable in a solvent for a sufficient period of time to bond the individual filaments comprising the yarn together and to bond the warp and weft yarns together at their points of intersection.

11. A method for making woven cable comprising: Providing a woven cable having an interwoven lattice structure holding a plurality of insulated wires in spaced parallel relationship, said lattice structure comprising fiberglass yarn coated with a plastic material, said plastic material being characterized by the temperature required for effecting bonding of the same to itself being below the temperature required for bonding said insulation to said plastic material, heating said cable at a temperature below the temperature at which said insulation will bond to the insulation for a sufficient period of time to effect bonding of the lattice structure.

12. A method as claimed in claim 11 wherein the wires are coated with sintered polytetrafluoroethylene and the fiberglass is coated with perfluoroethylene-propylene copolymer.